March 17, 1970 F. T. SMITH 3,500,565
CONVEYOR SYSTEM HAVING PLURAL UNLOADING STATIONS
Filed Nov. 6, 1967 3 Sheets-Sheet 3
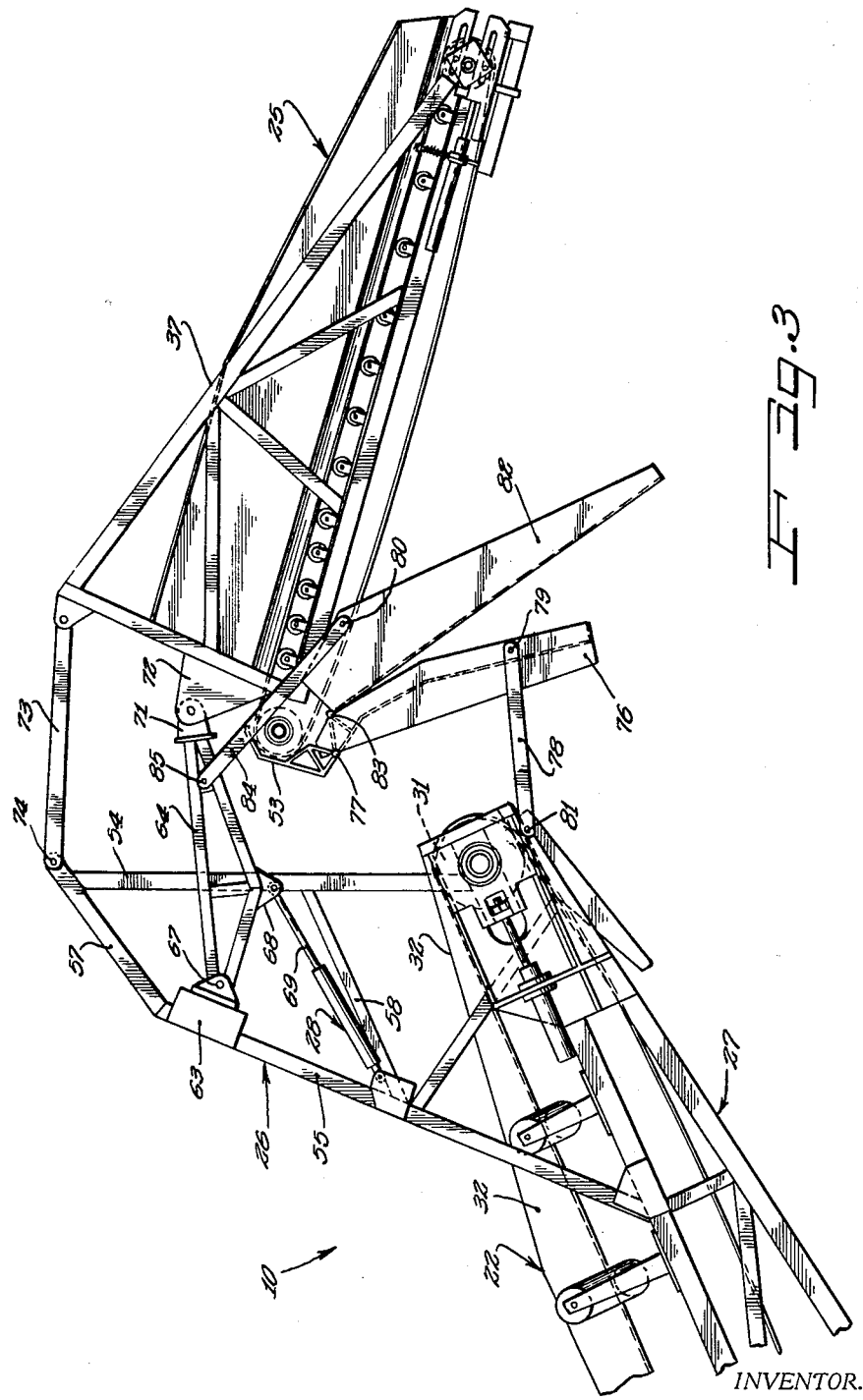
INVENTOR.
Fred T. Smith
ATTORNEYS

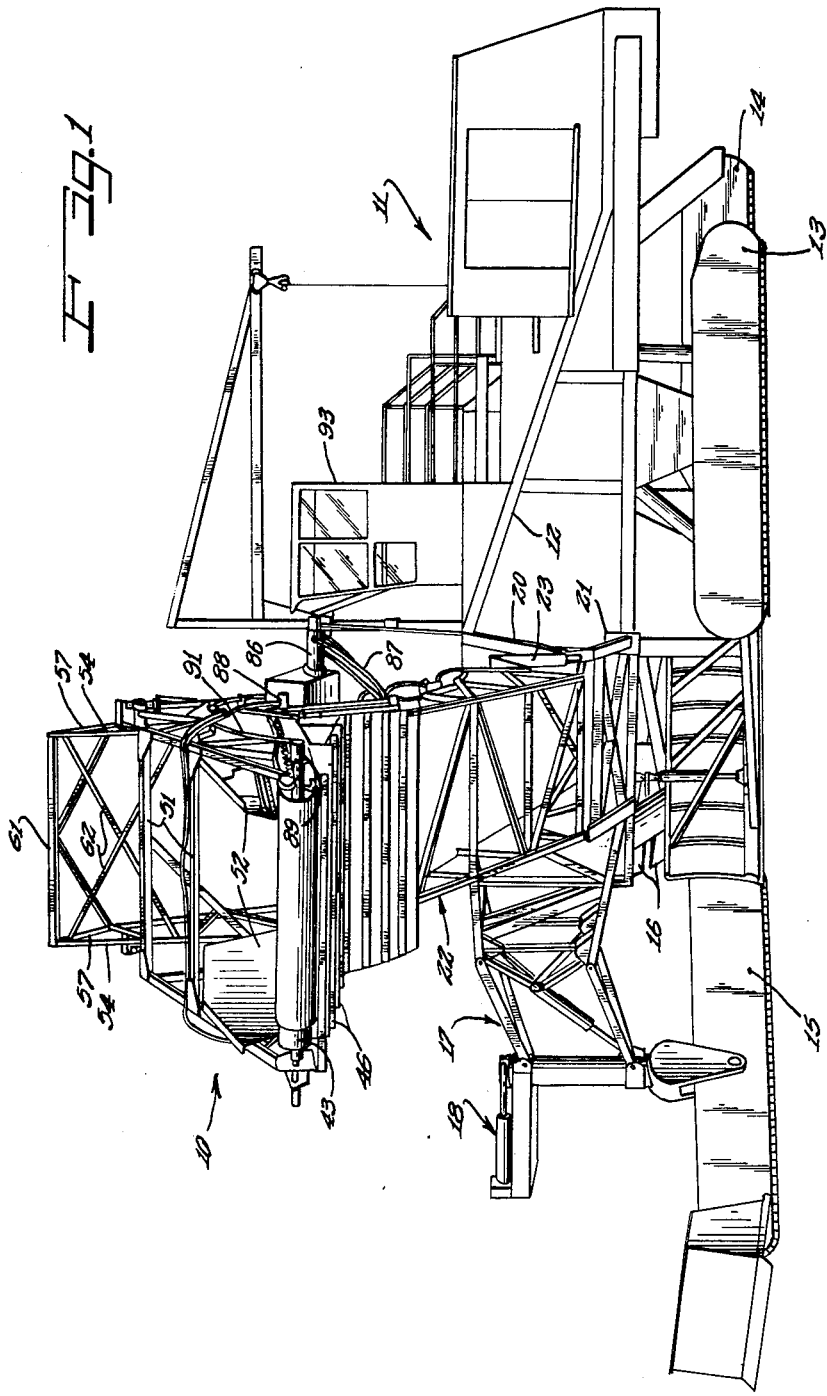

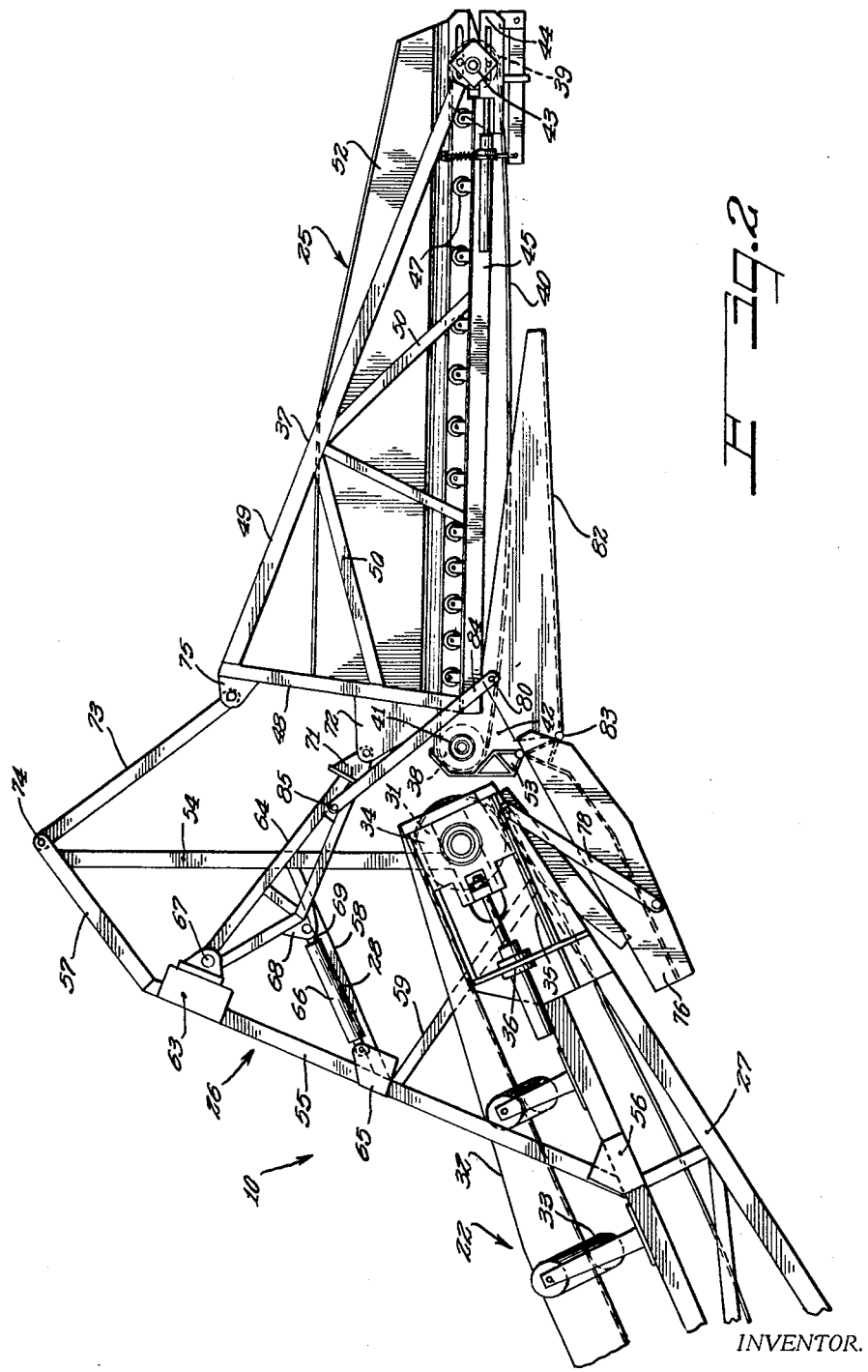

United States Patent Office 3,500,565
Patented Mar. 17, 1970

3,500,565
CONVEYOR SYSTEM HAVING PLURAL UNLOADING STATIONS
Fred T. Smith, Aurora, Ill., assignor to Barber-Greene Company, Aurora, Ill., a corporation of Illinois
Continuation-in-part of application Ser. No. 496,107, Oct. 14, 1965. This application Nov. 6, 1967, Ser. No. 680,825
Int. Cl. E02f 3/24; B65g 47/44
U.S. Cl. 37—190                                16 Claims

ABSTRACT OF THE DISCLOSURE

A conveyor system especially useful with a material handling device having first and second unloading stations to allow the selective loading of a hauling unit positioned beneath either station. The system has a first conveyor disposed to receive material from the material handling device and transport it to the first station to be selectively discharged into a hauling unit or onto a second conveyor which will transport the material to the second station. The second conveyor is pivotally attached to the first conveyor and is moveable into and out of the path of the material discharged from the first conveyor. The system includes a deflecting chute and a spillage chute attached to the second conveyor for catching spillage when the second conveyor is transporting material. When the second conveyor is moved out of the path of the material discharged from the first conveyor, the chutes are pivoted to empty their contents into the unit below the first station, and the deflecting chute is moved into the path of the discharge of the first conveyor to direct the material downward into the unit below the first station.

CROSS REFERENCES TO RELATED CASES

The present invention is a continuation-in-part of my copending application entilted "Excavator," Ser. No. 496,107, filed Oct. 14, 1965.

BACKGROUND OF THE INVENTION

Field of the invention

The present invention pertains to a conveyor system adapted to selectively discharge material from one of two unloading stations.

Prior art

High capacity conveying systems which are capable of transporting and conveying material at a high rate of speed will load a hauling unit such as a truck in a short period of time. The rapid filling of the truck by the conveying system necessitates that the system be shut down while positioning another empty truck beneath the unloading station of the conveying system. Conveying systems for material handling devices such as those disclosed in my copending application entitled "Excavator," U.S. patent application Ser. No. 496,107 and my copending patent application entitled "Reclaimer," U.S. patent application Ser. No. 504,739 which are both high capacity material handling devices are faced with the problem that the material handling device and its conveyor system will fill a truck in a matter of a few minutes and must be placed out of operation until another hauling unit or truck is positioned under the unloading station.

My copending application entitled "Excavator" mentioned herein above discloses a conveying system having two unloading stations of which one may be selected for unloading while a second hauling unit is positioned beneath the second station. Such an arrangement allows the rapid conveying and loading of material into one unit while a second empty unit is being positioned under the unused station and thus the only delay in loading of the hauling means is from switching from the first to the second loading station.

SUMMARY OF THE INVENTION

The present invention provides a conveying system having a first conveyor with a first unloading station and a second conveyor which may be positioned to receive material from the first conveyor and transport it to a second unloading station spaced from the first station. The system includes a pivoting structure which maintains the second conveyor in the proper alignment with the first conveyor when positioned to receive material therefrom. The system further includes deflecting and spillage chutes attached to the second conveyor which prevent material from falling at the first unloading station when the second conveyor is in operation.

Accordingly, it is an object of this invention to provide a conveying system having more than one unloading station.

Another object of the present invention is to provide a device and method for loading a pair of hauling units sequentially without any loss of time for positioning the units under the unloading stations.

Yet another object of the present invention is to provide a loading system having two unloading stations and having the means to prevent spillage on the unit underneath the first unloading station while the second station is being used.

Still a further object of the present invention is to provide a conveying system in which the height of the unloading stations is adjustable.

Other objects and features of the present invention will more fully become apparent in view of the following detailed descriptions taken in conjunction with the accompanying drawings illustrating one embodiment of the invention.

On the drawings:

FIG. 1 illustrates a conveying system of the present invention attached to a material handling device of the rotary wheel type;

FIG. 2 is a fragmentary illustration of the conveying system illustrating the discharge end in which the outermost unloading station is in operation; and FIG. 3 is a fragmentary view of the conveying system in which the innermost unloading station is in operation.

As shown on the drawings:

The principles of the present invention are particularly useful when incorporated in a conveying system generally indicated at 10 and mounted on a material handling device generally indicated at 11. Briefly, the material handling device 11 is similar to the material handling device more fully described in my above mentioned copending application Ser. No. 496,107 and comprises a frame 12 supported on a pair of rear transporting and propelling means 13 and 14 and a front transporting and propelling means 15. The front transporting means is offset from at least one of the pair of rear transporting means 13 and 14 to provide a wheel area on the side opposite to the conveying system 10 for receiving a digging wheel 16 which loads material into an internal conveying device (not illustrated) which is a source of material for the conveying system 10. The digging wheel 16 is positioned directly ahead of the rear transporting means and extends outwardly from the side of the frame 12 and transversely to one side of the front transporting means 15. To adjust the height of the material handling device 11, the front transporting means 15 is connected to the frame 12 by a height adjusting means 17 comprising pairs of pivotal arms and a hydraulic ram which raise and lower the frame with respect to the front transporting means 15. The material handling device 11 is provided with a steering means 18 comprising hydraulic rams, which extend between the front transporting means 15 and the height adjusting means 17. Movement of the ram of the steering means 18 changes the direction of movement of the transporting means 15 with respect to the frame 12 to turn the device 11.

The conveying system 10 is attached to the material handling device by a frame structure 20 which is detachably secured to the frame 12 at pads 21 and supports a first conveyor means generally indicated at 22 by means of a pair of hydraulic cylinders 23, 23 which allow selection of the angle of the first conveying means 22 with respect to the conveyor system frame 20. The first conveyor means 22 is supported in the frame 20 with one end extending into the frame 12 of the material handling device to receive material transported by the internal conveying means of the material handling device 11.

As best illustrated in FIG. 2 the conveying system 10 comprises the first conveying means 22 which terminates at a first unloading station and has a second conveying means 25 attached to a upright frame structure 26 which is attached to a frame 27 of the first conveyor means. The upright structure 26 is provided with an actuating means 28 to move the second conveyor means from a first position illustrated in FIG. 2 in which the conveyor receives the material from the first conveyor to a second position, best illustrated in FIG. 3, in which the second conveyor means is in an uplifted position that is clear of the discharge path of the first conveying means 22.

The frame structure 27 of the first conveyor means 22 supports a foot roll and a head roll 31 on which an endless conveyor belt 32 passes around and between. The frame 27 also supports a series of conveyor support rolls 33 arranged in groups. As illustrated, the rolls of each group have their axes oriented in an angular relation with each other so as to bend the belt 32 into a trough like channel. To support and adjust the position of the head roll 31, the frame 27 supports bearing blocks 34, 34 which rotatably support each end of the roll 31. Each of the bearing blocks 34 are slidably positioned in a bearing block support slide 35 by an adjustment means 36 which allows the position of the roll 31 to be adjustable with respect to the frame to control the amount of tension on the endless belt 32.

The second conveyor means 25 comprises a frame structure 37 supporting a foot roll 38 and a head roll 39 which support and carry a conveyor belt 40. The foot roll 38 is rotatably supported at each of its ends in a bearing 41 in a plate 42 located on each side of the frame structure 37. The head roll 39 is supported at each end by an adjustable bearing block 43 which is adjustable with respect to a plate member 44 located on each side of the frame 37 adjacent the second unloading station. The plates 42 and 44 on one side of the frame are interconnected by a longitudinal extending frame member 45 which forms a base side of a triangular shaped side of the additional frame structure or second conveyor frame structure 37. The frame member 45 is interconnected to an identical frame member on the opposite side, as best illustrated in FIG. 1, by cross support members 46 to form a platform for supporting a plurality of conveyor rollers 47 on which the endless belt 44 travels while in the load carrying position.

Each of the triangular shaped sides of the frame structure 37 is completed by an upstanding frame member 48 attached to the member 45 and by a second side member 49 extending from the opposite end of the member 45. A plurality of brace supports 50 extend between the frame members 48 and 49 and the member 49 and 45 as best illustrated in FIG. 2. The triangular sides are interconnected by braces 51 which extend between the members 49, 49. To maintain the material being conveyed on the belt 40, side wall members 52 are attached to the triangular sides formed by the members 49 and 48 of the frame structure 37.

To protect the foot roll 38 from damage from material being transported by the conveying system 10, a deflecting means comprising a protecting plate 53 is provided and extends between the side plates 42, 42 of the frame structure 37. As may be seen in FIGS. 2 and 3, the protective plate 53 has a portion which curves substantially about the foot roll 38 so that a direct blow by the discharge from the first conveyor means 22 to the foot roll and the belt traveling thereon will be prevented.

The upright or upstanding frame structure 26 comprises side members made up of an upstanding member 54 attached to each side of the conveyor frame 27 adjacent the head roll 31 and an angular extending member 55 which is attached to each side of the frame structure 27. The joint between the frame 27 and member 55 is reinforced by a triangular shaped support pad 56. The frame member 55 has a curved portion 57 which interconnects the members 54 and 55 together. To increase the rigidity of the members 54 and 55 a cross brace 58 extends therebetween and a second cross brace 59 extends between the member 55 and the frame structure 27. As best illustrated in FIG. 1, the upstanding members 54 and 55 on one side are interconnected to the members on the opposite side of the conveying system 10 by a cross brace 61 and further reinforced by angular extending cross braces 62.

Each of the members 55 are provided with reinforced pads 63 which provide means to make a pivoting connection 67 between the upright structure 26 and one end of a triangular shaped pivot arm 64. To provide a base for the actuating means 28 each of the members 55 is provided with an actuating member base plate pad 65 which provides a pivotal connection between the member 55 and a cylinder 66 of the actuating means 28. The triangular arm 64 at a corner nearest the connection 67 has a pad 68 which is pivotally attached to an end of a ram 69 of the actuating means 28.

To attach the additional frame structure 33 to the pivoting arm 64, the remaining corner which is the farthest from the connection 67 is provided with a pad 71 which is pivotally connected to a pad 72 which is secured to the member 48. To complete the connections between the additional frames 37 and the upstanding frame structure 26, a second pair of pivotal arms 73 extend between a pivotal connection 74 at the outer end of the member 57 and a pivotal connection with a pad 75 which is attached to the member 48 at the corner formed by the members 49 and 48.

To move the second conveying means 25 to the position illustrated in FIG. 3, hydraulic fluid is introduced to the cylinder 66 of the actuating means 28 and forces the rams 69 to an extended position which in turn pivots the arm 64 upwardly about its connection at 67 to the upstanding frame 26. This upward pivoting motion lifts the conveying means 25 to a position in which it is removed from the flow of material that is being discharged from the first conveyor means 22.

As the material is being transported by the first conveying means 22, it leaves the belt 32 as the belt passes around the head roll 31. Since the belt 32 is moving at a high speed, the material has imparted to it a velocity in the upward direction so that when it leaves the belt 32 it is projected upward and outward from the end of the first conveying means 22. To cause the material to be deflected downward, the deflecting means includes a deflecting chute 76 attached to the frame of the second conveyor means 25 by a pair of pivotal connections 77 between the chute and the ends of the deflecting plate. The chute 76 is disposed in the path of the material being discharged from the first conveying means 22 and deflects it downward into a hauling unit placed beneath the first unloading station. The chute 76 is connected to the frame 27 of the first conveying means 22 by a positioning means comprising a pair of pivoting arms 78 which are pivotally connected to each side of the chute at 79 and to a side of the frame 27 at 81. When the second conveying means 25 is lowered into a position to receive the discharged material from the first conveyor means 22, the pivoting arm 78 pivots the chute 76 into a position, best illustrated in FIG. 2, in which it performs a second function of catching spillage from the conveyor belt adjacent the end of the first conveyor 22.

To prevent spillage from the second conveyor means 25, a spillage chute 82 for catching material falling from the second belt 42 is pivotally connected at 83 on each side of the deflecting plate 53 and, as illustrated in FIG. 2, is held in a position parallel to the belt 40 by pivotal arms 84, 84 which extends from the pivotal connections 80 on each side of the chute 82 to a pivotal connection 85 on the pivoting arm 64. When the second conveyor means 25 is raised to its upward position, as illustrated in FIG. 3, the pivoting arms 84 allow the chute 82 to rotate in a clockwise direction about its connections 83 to the deflecting plate 53 so that its contents may be dumped into the truck or hauling unit positioned beneath the first unloading station.

As discussed hereinbefore, the rapid speed of movement of the belt 32 of the first conveying means tends to throw the material upward off of the end of the first conveying means so that the second conveying means when positioned as illustrated in FIG. 2 will receive the material and transport it to its head end defined by the plates 44 which form a second unloading station which is remote from the first unloading station. The speed in which the belts are operating causes the material to be thrown in a trajectory tangential to the surface of the belt 32 and thus the second conveying means 25 is positioned so that its belt 40 is at substantially the same height as the end of the belt 32 as it passes over the roller 31.

To drive the first conveying means 22, a hydraulic motor 86 is attached to the head roll 31 as best illustrated in FIG. 1 and receives hydraulic fluid by means of conduits 87 which extend to the material handling device 11. It should be noted that the foot roll which is positioned in the frame 12 of the material handling means adjacent to the internal conveying system of the material handling means may be driven by any conventional means such as a direct mechanical or hydraulic drive. To drive the second conveyor means 25, both the foot roll 41 and the head roll 43 are provided with hydraulic motors 88 and 89, respectively. The motors 88 and 89 receive hydraulic fluids from the material handling device by means of conduits such as 91.

To operate the actuating means 28, hydraulic conduits similar to 87 and 91 extend from the material handling device 11 and are controlled by suitable control means (not illustrated) in the operator's cab 93.

The material handling device 11 with the conveyor system 10 operates by the digging wheel 16 digging material in the wheel's path and lifting the material above the floor on which the device is traveling. The dug material is then dumped into the internal conveying means which confines and moves the material in a stream or mat at an angle to the path of the wheel. The first conveyor means 22 receives the material from the internal conveyor and confines and moves the material by the belt 32 upwardly to a first unloading station. At the first unloading station the material is discharged into a path or stream of material which is received or caught by the second conveyor means 25 and confined and moved to the second unloading station.

To prevent spillage at the first unloading station while the belt 40 is moving the material, the deflecting chute 76 and spillage catching chute 82 are disposed beneath the conveyor belts 32 and 40 adjacent to the first unloading station. When the actuating means moves or locates the second conveyor means to the second position, the chutes 76 and 82 are moved about their connections to discharge or dump their contents into the hauling units positioned beneath the first station. When the deflecting chute 76 is moved to dischrge its contents, it is positioned or located in the discharge path of the first conveyor means 22 and controls the direction of the discharge path by deflecting the path downward into the hauling unit disposed at the first station.

The locating of the second conveyor means 25 between the first and second position allows the operator of the device to discharge the stream of material selectively at the first or second stations. Therefore, the operator can selectively load a hauling unit positioned beneath either of the unloading stations.

It should be noted that the conveying system 10 has been described as being utilized with the material handling device 11. However, the frame 20 could be modified to support the system as an independent unit. The system 10 could be utilized as any conveyor for hoisting material introduced at its one end to a height for loading into hauling units or trucks.

I claim as my invention:
1. A conveyor system comprising:
   a frame structure;
   a first conveyor means supported by said frame structure with one end disposed to receive material and transport said material to a first unloading station at the opposite end of said first conveyor;
   a second conveyor means having one end pivotally supported adjacent said first station by said frame structure and having a second unloading station remote from said first unloading station;
   a deflecting means pivotally attached to said one end of the second conveyor means, said deflecting means pivotal between a deflecting position and a spillage catching position; and
   actuating means for moving said second conveyor means into selective positions with respect to said first unloading station and for enabling said material to be unloaded from said conveyor system at either said first or second unloading station.

2. A conveyor system for transporting material from a source to an unloading station, comprising in combination:
   a frame structure;
   a first conveyor means supported by said frame structure with one end disposed to receive material from said source, and the other end defining a first unloading station;
   additional frame structure pivotally attached to said frame structure adjacent said first unloading station;
   a second conveyor means supported in said additional frame structure having one end disposed to receive material from said first unloading station and the other end defining a second unloading station spaced from said first station;
   a deflecting structure attached to said additional frame structure to protect said second conveyor means from material being discharged at said first station, said deflecting structure including a deflecting chute having a pivotal connection with said additional frame structure adjacent said one end of said second conveyor means, said chute adapted to pivot about said connections between a deflecting position and a spillage catching position; and
   a means to selectively position said additional frame structure and second conveyor means between a first position for receiving material from said first conveyor means to transport to said second unloading station and a second position above said first station allowing said material to be discharged from said first station.

3. A conveying system according to claim 2, wherein said deflecting structure includes positioning means extending between said chute and said frame structure, said positioning means pivoting said chute between a position disposed beneath said first station to catch spillage when said second conveyor means is in said first position disposed in the path of the discharge from said first station when said second conveyor means is in said second position.

4. A conveying system according to claim 3, wherein said positioning means comprises a pivoting arm whereby said arm causes said chute to pivot about its connection to said additional frame structure as said structure is moved by said actuating means.

5. A conveying system according to claim 2, wherein a spillage chute is pivotally attached to said deflecting structure and positioned beneath said second conveying means to prevent spillage therefrom from falling on hauling units positioned beneath said first unloading station.

6. A conveying system according to claim 5, wherein said spillage chute is interconnected to said actuating means by pivotal arm connections so that the movement of said additional structure and said second conveying means to said second position causes said spillage chute to be pivoted downward to dump materials collected by said spillage chute into a hauling unit positioned under said first unloading station.

7. A conveying system for transporting material from a source to unloading stations for loading said material into hauling units, comprising in combination:
  a frame structure;
  a first conveyor means including a first conveyor frame structure supporting a first conveyor belt, said first conveyor means supported in said frame structure with one end disposed to receive material from said source to transport said material to a first unloading station at the other end of said first conveyor means;
  upstanding frame structure attached to said first conveyor frame structure at said other end;
  additional frame structures pivotally attached to said upstanding frame structure adjacent said first unloading station;
  a second conveyor means supported in said additional frame structure having one end disposed to receive material from said first unloading station and the other end defining a second unloading station spaced from said first station;
  actuating means attached to said upright frame structure to selectively position said additional frame structure and said second conveyor means between a position for receiving material from said first conveyor means to transport said material to said second station and a position disposed above said first station allowing said material transported by said first conveyor means to be discharged at said first station; and
  a deflecting chute pivotally attached to said additional frame structure adjacent said one end of said second conveyor means, said chute being disposed in the path of said material being discharged from said first conveyor means when said actuating means has positioned said additional frame structure and second conveyor means in the uplifted position, to deflect material discharged therefrom into said hauling units positioned under said first unloading station and said deflecting chute being pivoted beneath said other end of said first conveyor means when said second conveyor means is positioned in a material receiving position to catch spillage from said first conveying means.

8. A conveyor system according to claim 7, wherein said frame structure includes means to vary the angular relation of said first conveying means with respect to said frame structure.

9. A conveyor system for transporting material from a source to a position to be loaded into hauling units, comprising in combination:
  a main frame structure;
  a first conveyor means including a first conveyor frame structure supporting an endless conveyor belt and means to rotate said belt, said first conveyor means supported in said main frame with one end positioned at said source of material to transport said material to a first unloading station at the opposite end thereof, said conveyor frame structure including an upstanding frame structure at said opposite end;
  second conveyor means including a second conveyor frame structure supporting a second endless conveyor belt and means to rotate said belt, said second conveyor means having one end to receive material from said first conveyor means and transport said material to a second unloading station at the other end of said second conveyor means;
  a pair of pivotal arms interconnecting said second conveyor frame structure to said upright frame structure with pivotal connections, said arms supporting said second conveyor means in selected positions with respect to the discharge path of said first conveyor means, said positions including one position in which said second conveyor means is in said discharge path and another position in which said conveyor means is above said discharge path;
  a deflecting chute having one end pivotally attached to said one end of said second conveyor means, said chute having members interconnecting said chute to said frame structure of said first conveyor means so that said chute assumes a position beneath said other end of said first conveyor means as said second conveyor means is in said one position to collect spillage therefrom, said chute being disposed in said discharge path to deflect said path downward when said second conveyor means is displaced to said other position; and
  actuating means attached to said upstanding structure and acting on said pair of arms to selectively position said second conveyor means to obtain unloading at either said first or second unloading stations.

10. A conveyor according to claim 9, wherein a spillage chute having a pivotal connection to said second conveyor means adjacent to said one end, said spillage chute lying beneath said one end to catch spillage when said second conveyor means is in said one position and said spillage chute being pivoted about said connection as said second conveyor means assumes said other position so that material caught by said spillage chute is dumped into a hauling unit beneath said first unloading station.

11. A machine for material handling comprising:
  a frame supported by at least one propelling and transporting means;
  a digging means supported for rotation on said frame to dig material.
  a first conveyor means supported on said frame with one end disposed to receive said material and transport it to a first unloading station remote from said digging means;
  a second conveyor means supported by said frame with one end adjacent said first station and having a second unloading station remote from said first station;
  a deflecting means mounted on said second conveyor means having a deflecting chute pivoting between a first position deflecting the discharge from said first station and a second position adjacent said first station catching the spillage therefrom; and
  actuating means to move said second conveyor means into selective positions with respect to said first station enabling said material to be unloaded from said machine at either said first or second stations, said actuating means pivoting said chute to said first position when said material is unloaded at said first station.

12. A method of transporting material from a source and loading said material into hauling units, comprising the steps of:
  carrying said material on a moving belt from said source to a first unloading station;

discharging said material in a path from said belt at said station;

providing a second moving belt adjacent said station for receiving said material therefrom and carrying said material to a second unloading station spaced from said first station;

providing a pivotal chute means adjacent said first station; selectively locating said second belt with respect to said first station between a first position disposed in said path for receiving said material and a second position disposed out of said path, said locating enabling the selective loading of a unit disposed beneath either of said stations; and pivoting said chute means between a deflecting position and a spillage catching position beneath the first station so that said chute is disposed beneath said first station when said second belt is in said first position and is disposed in said path when said second belt is in said second position.

13. A method of transporting material from a source and loading said material into hauling units, comprising the steps of:

carrying said material on a moving belt from said source to a first unloading station;

discharging said material in a path from said belt at said station;

providing a second moving belt adjacent said station for receiving said material therefrom, and carrying said material to a second unloading station spaced from said first station;

providing a spillage collecting means adjacent and beneath said first station to collect spillage therefrom;

selectively locating said second belt with respect to said first station between a first position disposed in said path for receiving said material and a second position disposed out of said path, said locating including moving the spillage collecting means from beneath the first station to a position discharging the contents thereof into a hauling unit disposed beneath said first station as said second belt assumes the second position, said locating enabling the selective loading of a hauling unit disposed beneath either of said stations.

14. A method of transporting and loading according to claim 13, wherein said locating further includes positioning a part of said collecting means into the path of said discharge from said first station while said collecting means are discharging their contents so that said path is deflected downward into a unit disposed beneath said first station.

15. A machine for material handling comprising:

a main frame including front and rear frame transporting and propelling means with said front transporting and propelling means being offset to one side of a longitudinal centerline of said rear transporting and propelling means to provide a wheel area;

a digging wheel mounted on said main frame in said wheel area and positioned directly ahead of said rear transporting and propelling means and extending transversely to one side of said front transporting and propelling means;

a first conveyor extending transversely of the digging wheel and the main frame having one end positioned for receiving materials unloaded from the digging wheel and for transporting the material to a side of the main frame remote from the digging wheel for unloading at a first unloading station;

a second conveyor supported on said main frame and having a second unloading station positioned outwardly of said first unloading station;

a deflecting means pivotally attached to said second conveyor at an end adjacent to said first station, said deflecting means pivotal between a deflecting position and a spillage catching position; and means for positioning said second conveyor in selective positions relative to said first conveyor enabling materials to be unloaded from the conveyors at the first or second unloading stations.

16. A method of transporting material from a source comprising the steps of:

confining and moving said material in a stream of material, said stream flowing in a direction away from said source and upwardly to a first unloading point;

discharging said material from said stream at said point to form a flow of material;

selectively controlling the flow of material between a downward direction into a load hauling unit disposed beneath the first unloading point and a direction extending outwardly to a second unloading point removed from said first unloading point, said step of selectively controlling the flow including the step of positively deflecting the flow of the material downwardly at said first unloading point when discharging material into the load hauling unit under said first unloading point and the step of catching and moving said flow of material to said second unloading point when it is desired to discharge material into a second load hauling unit disposed therebeneath;

catching spillage at said first unloading point while discharging material at said second unloading point and discharging the spillage caught at said first unloading point into a load hauling unit disposed beneath said first unloading point when material is subsequently discharged at said first unloading point, whereby said selective controlling enables the loading of a load hauling unit disposed beneath either of said unloading points and said step of catching spillage prevents the falling of spillage at said first unloading point while discharging material from said second unloading point.

References Cited

UNITED STATES PATENTS

| | | | |
|---|---|---|---|
| 885,343 | 4/1908 | Hill | 37—97 |
| 923,064 | 5/1909 | Morenus | 198—73 |
| 3,390,473 | 7/1968 | Wilms et al. | 37—190 |
| 1,360,212 | 11/1920 | Harding | 198—81 |
| 2,615,586 | 10/1952 | Miller et al. | 214—522 |
| 2,762,490 | 9/1956 | Kling | 198—97 |
| 2,785,683 | 3/1957 | Davidson | 198—45 |
| 3,018,874 | 1/1962 | Bunnell | 198—72 |
| 3,020,656 | 2/1962 | Linden. | |
| 3,182,784 | 5/1965 | Coy | 214—522 |
| 3,195,251 | 7/1965 | Mittry | 37—190 |

ROBERT E. PULFREY, Primary Examiner

E. H. EICKHOLT, Assistant Examiner

U.S. Cl. X.R.

37—195; 198—73, 83, 117